US012739766B2

(12) United States Patent
Zhu

(10) Patent No.: US 12,739,766 B2
(45) Date of Patent: Sep. 15, 2026

(54) SYNCHRONIZATION SIGNAL DETERMINATION METHOD AND APPARATUS, AND COMMUNICATION DEVICE

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 338 days.

(21) Appl. No.: 18/547,370

(22) PCT Filed: Feb. 23, 2021

(86) PCT No.: PCT/CN2021/077491
§ 371 (c)(1),
(2) Date: Aug. 22, 2023

(87) PCT Pub. No.: WO2022/178671
PCT Pub. Date: Sep. 1, 2022

(65) Prior Publication Data

US 2024/0155524 A1 May 9, 2024

(51) Int. Cl.
*H04W 56/00* (2009.01)

(52) U.S. Cl.
CPC ... *H04W 56/0035* (2013.01); *H04W 56/0015* (2013.01)

(58) Field of Classification Search
CPC .......... H04W 56/0035; H04W 56/0015; H04B 7/18513
See application file for complete search history.

(56) References Cited

U.S. PATENT DOCUMENTS

2019/0097774 A1* 3/2019 Li .............................. H04L 5/00
2019/0281539 A1* 9/2019 Takeda .................. H04W 24/10
2022/0264589 A1* 8/2022 Sun ......................... H04W 4/70

FOREIGN PATENT DOCUMENTS

CN 109155719 A 1/2019
CN 110999428 A 4/2020
CN 111465022 A 7/2020

OTHER PUBLICATIONS

International Search Report and Written Opinion of International Application No. PCT/CN2021/077491, dated Oct. 8, 2021, 20 pages.
Qualcomm Incorporated, “Sync raster considerations below 6GHz”, 3GPP TSG-RAN WG1 #87, R1-1612022, Nov. 14-18, 2016, Reno, USA, 4 pages.
Kanj, Matthieu et al., “A Tutorial on NB-IoT Physical Layer Design”, COMST.2020.3022751, IEEE Communications Surveys & Tutorials, 2020, 39 pages.

(Continued)

*Primary Examiner* — Jianye Wu
(74) *Attorney, Agent, or Firm* — Finnegan, Henderson, Farabow, Garrett & Dunner, L.L.P.

(57) ABSTRACT

A method for determining a synchronization signal is performed by a user equipment (UE) and includes: receiving the synchronization signal and synchronization signal raster indication information; and determining a current synchronization signal raster corresponding to the synchronization signal according to the synchronization signal raster indication information.

16 Claims, 5 Drawing Sheets receiving the synchronization signal and synchronization signal raster indication information — 101

↓ determining a current synchronization signal raster corresponding to the synchronization signal according to the synchronization signal raster indication information — 102

(56) References Cited

OTHER PUBLICATIONS

First Office Action issued by the State Intellectual Property Office of People's Republic of China on Feb. 14, 2025, in corresponding Application No. CN 202180000526.8, 19 pages.
Extended European Search Report Issued in Application No. 21927118.6 dated Dec. 19, 2024, 7 pages.

* cited by examiner

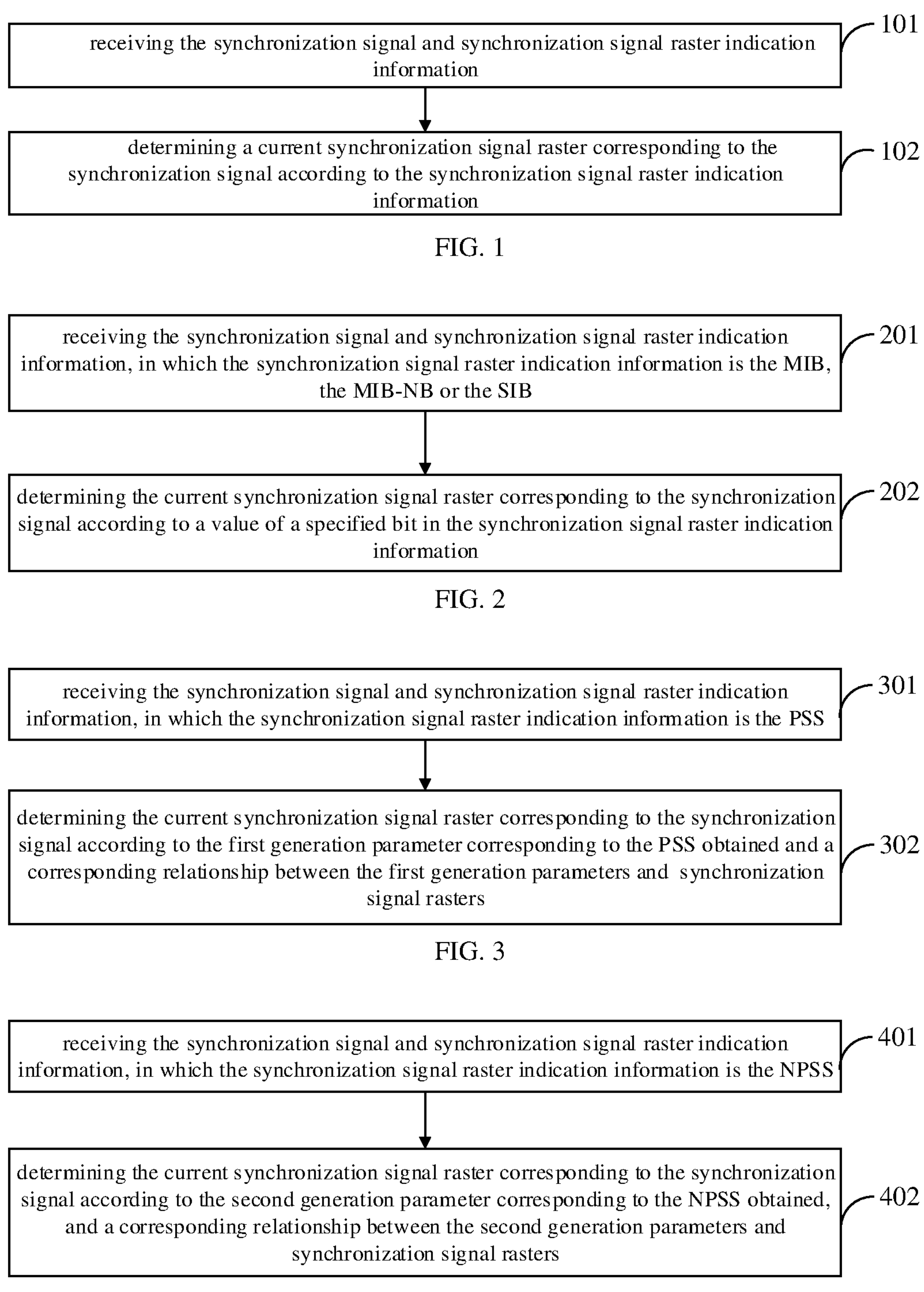
receiving the synchronization signal and synchronization signal raster indication information
101
determining a current synchronization signal raster corresponding to the synchronization signal according to the synchronization signal raster indication information
102
FIG. 1
receiving the synchronization signal and synchronization signal raster indication information, in which the synchronization signal raster indication information is the MIB, the MIB-NB or the SIB
201
determining the current synchronization signal raster corresponding to the synchronization signal according to a value of a specified bit in the synchronization signal raster indication information
202
FIG. 2
receiving the synchronization signal and synchronization signal raster indication information, in which the synchronization signal raster indication information is the PSS
301
determining the current synchronization signal raster corresponding to the synchronization signal according to the first generation parameter corresponding to the PSS obtained and a corresponding relationship between the first generation parameters and synchronization signal rasters
302
FIG. 3
receiving the synchronization signal and synchronization signal raster indication information, in which the synchronization signal raster indication information is the NPSS
401
determining the current synchronization signal raster corresponding to the synchronization signal according to the second generation parameter corresponding to the NPSS obtained, and a corresponding relationship between the second generation parameters and synchronization signal rasters
402
FIG. 4

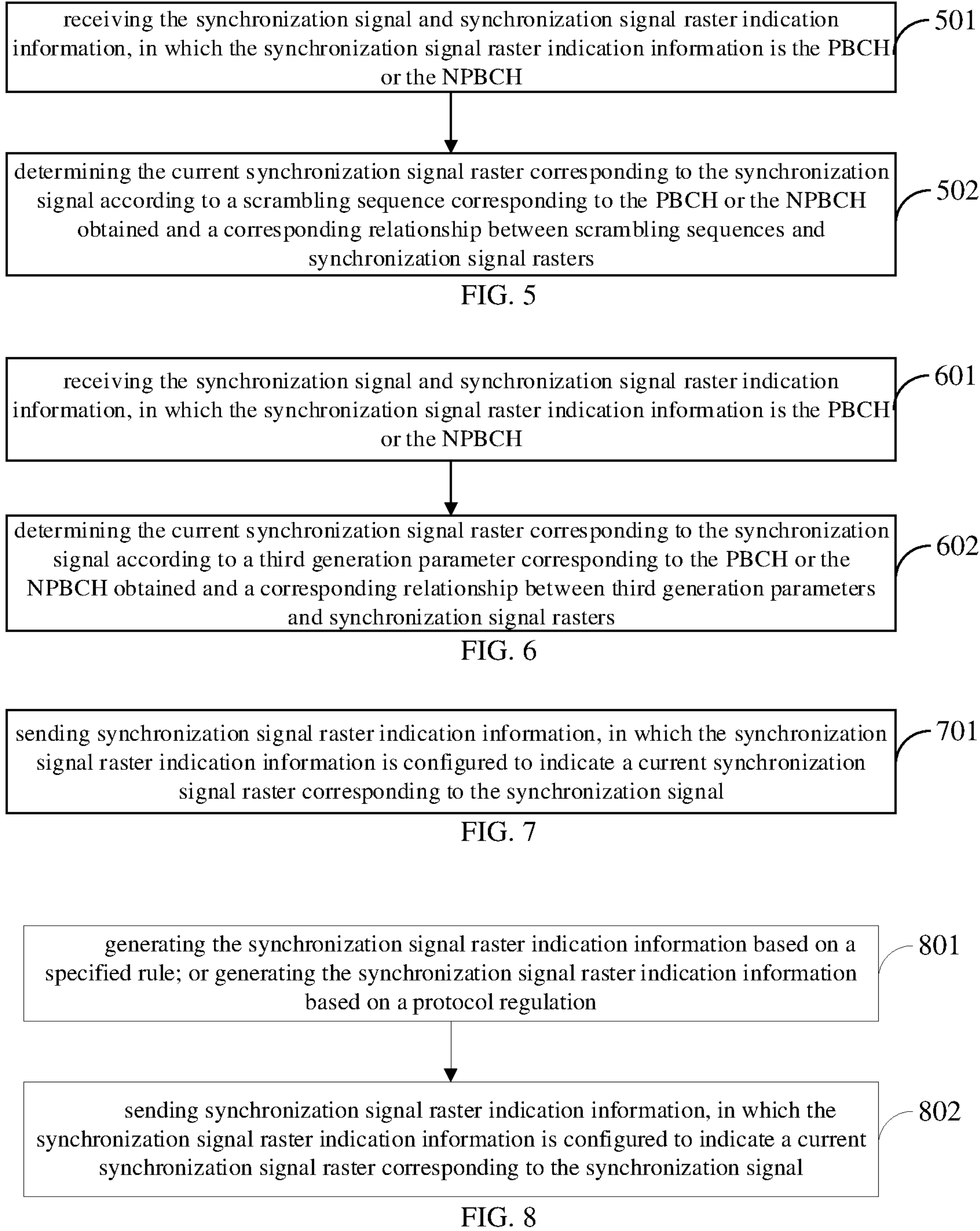
receiving the synchronization signal and synchronization signal raster indication information, in which the synchronization signal raster indication information is the PBCH or the NPBCH
501
determining the current synchronization signal raster corresponding to the synchronization signal according to a scrambling sequence corresponding to the PBCH or the NPBCH obtained and a corresponding relationship between scrambling sequences and synchronization signal rasters
502
FIG. 5
receiving the synchronization signal and synchronization signal raster indication information, in which the synchronization signal raster indication information is the PBCH or the NPBCH
601
determining the current synchronization signal raster corresponding to the synchronization signal according to a third generation parameter corresponding to the PBCH or the NPBCH obtained and a corresponding relationship between third generation parameters and synchronization signal rasters
602
FIG. 6
sending synchronization signal raster indication information, in which the synchronization signal raster indication information is configured to indicate a current synchronization signal raster corresponding to the synchronization signal
701
FIG. 7
generating the synchronization signal raster indication information based on a specified rule; or generating the synchronization signal raster indication information based on a protocol regulation
801
sending synchronization signal raster indication information, in which the synchronization signal raster indication information is configured to indicate a current synchronization signal raster corresponding to the synchronization signal
802
FIG. 8

SYNCHRONIZATION SIGNAL DETERMINATION METHOD AND APPARATUS, AND COMMUNICATION DEVICE

CROSS-REFERENCE TO RELATED APPLICATIONS

The present application is a national phase entry of International Application No. PCT/CN2021/077491, filed Feb. 23, 2021, the entire disclosures of which are incorporated herein by reference.

TECHNICAL FIELD

The present disclosure relates to a communication technical field, and more particularly to a method for determining a synchronization signal, an apparatus for determining a synchronization signal and a communication device.

BACKGROUND

The continuous emergence of a new generation of new industries such as virtual reality (VR), augmented reality (AR) and vehicle-to-vehicle communication has put forward higher requirements for wireless communication technology, such that the wireless communication technology is continuously developed to meet the needs of various industry applications.

In the research of the wireless communication technology, a non-terrestrial network communication system (NTN for short), such as satellite communication, is considered to be an important aspect of future wireless communication technology development. Satellite communication refers to communication carried out by a radio communication device on the ground using satellites as relay nodes. The satellite communication system consists of a satellite part and a ground part. The characteristics of the satellite communication are that a communication range is large, and as long as it is within a range covered by the radio waves emitted by the satellite, communication may be carried out between any two points, and it is not easily affected by land disasters, with high reliability.

In remote areas that are not covered by a cellular network, new industries also have strong requirements, for example, in transportation (maritime transport, land, railway, aviation) and logistics, environmental testing, mining and other industries. Narrow Band Internet of Things (NB-IoT for short), enhanced machine type communication (eMTC for short), etc. are very suitable for the above-mentioned industry applications, but they need to be connected through satellites to provide coverage.

In related art, the NB-IoT or eMTC networks based on the satellites will generate large Doppler frequency shift due to high-speed movement of the satellites (especially low-orbit satellites). When a sum of the Doppler frequency shift and a crystal frequency offset of a terminal is greater than ½ of the synchronization signal raster, the synchronization signal raster on the user equipment (UE for short) will be blurred, causing the user equipment to fail to synchronize correctly.

SUMMARY

According to a first of the present disclosure, a method for determining a synchronization signal is provided, which is applied to a user equipment (UE) and includes:

receiving the synchronization signal and synchronization signal raster indication information; and determining a current synchronization signal raster corresponding to the synchronization signal according to the synchronization signal raster indication information.

According to a second of the present disclosure, a method for determining a synchronization signal is provided, which is applied to a network device and includes:

sending synchronization signal raster indication information, in which the synchronization signal raster indication information is configured to indicate a current synchronization signal raster corresponding to the synchronization signal.

According to a third aspect of the present disclosure, a communication device is provided, which includes:

at least one processor; and a memory communicatively coupled to the at least one processor; in which the memory stores instructions executable by the at least one processor, and the instructions are executed by the at least one processor to cause the at least one processor to perform the method for determining the synchronization signal in the first aspect or the method for determining the synchronization signal in the second aspect of the present disclosure.

BRIEF DESCRIPTION OF THE DRAWINGS

Example embodiments will be described in detail below with reference to the drawings, in which:

FIG. 1 is a schematic flowchart illustrating a method for determining a synchronization signal according to an embodiment of the present disclosure;

FIG. 2 is a schematic flowchart illustrating another method for determining a synchronization signal according to an embodiment of the present disclosure;

FIG. 3 is a schematic flowchart illustrating another method for determining a synchronization signal according to an embodiment of the present disclosure;

FIG. 4 is a schematic flowchart illustrating another method for determining a synchronization signal according to an embodiment of the present disclosure;

FIG. 5 is a schematic flowchart illustrating another method for determining a synchronization signal according to an embodiment of the present disclosure;

FIG. 6 is a schematic flowchart illustrating another method for determining a synchronization signal according to an embodiment of the present disclosure;

FIG. 7 is a schematic flowchart illustrating another method for determining a synchronization signal according to an embodiment of the present disclosure;

FIG. 8 is a schematic flowchart illustrating another method for determining a synchronization signal according to an embodiment of the present disclosure;

DETAILED DESCRIPTION

Figure 9:
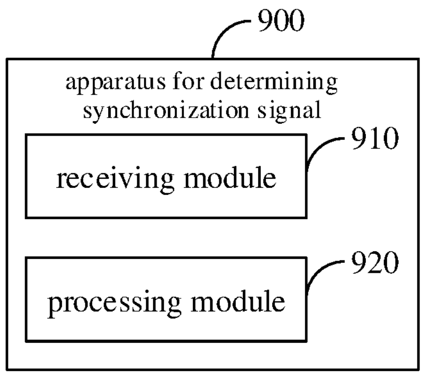
FIG. 9 is a schematic diagram illustrating an apparatus for determining a synchronization signal according to an embodiment of the present disclosure.

Embodiments of the present disclosure are described in detail below, examples of which are illustrated in the drawings, in which the same or similar reference numerals denote the same or similar elements or elements having the same or similar functions throughout. Embodiments described below by referring to the figures are illustrative and are intended to explain the present disclosure and should not be construed as limiting the present disclosure.

In related art, the NB-IoT or eMTC networks based on the satellites will generate large Doppler frequency shift due to high-speed movement of the satellites (especially low-orbit satellites). When a sum (up to 79.78 kHz) of the Doppler frequency shift and a crystal frequency offset of a terminal is greater than ½ of the synchronization signal raster, the synchronization signal raster on the user equipment (UE for short) will be blurred, causing the user equipment to fail to synchronize correctly.

To solve this problem, in the present disclosure, the UE may determine a current synchronization signal raster corresponding to a synchronization signal according to the synchronization signal raster indication information received, that is, the UE may determine a correct frequency range for sending the synchronization signal, which solves the confusion problem of the synchronization raster caused by the frequency offset. A method for determining a synchronization signal, an apparatus for determining a synchronization signal, a user equipment, and a network device provided by the present disclosure will be described in detail below with reference to the accompanying drawings.

FIG. 1 is a schematic flowchart illustrating a method for determining a synchronization signal according to an embodiment of the present disclosure, and the method may be executed by a UE. As shown in FIG. 1, the method for determining the synchronization signal includes the following steps.

In step 101, the synchronization signal and synchronization signal raster indication information are received.

In the present disclosure, the UE may receive the synchronization signal and the synchronization signal raster indication information sent by the network device. The synchronization signal raster indication information is configured to indicate a current synchronization signal raster corresponding to the synchronization signal.

Optionally, the synchronization signal raster indication information may be at least one of: a primary synchronization signal (PSS for short), a narrow band primary synchronization signal (NPSS for short), a physical broadcast channel (PBCH for short), a narrow band physical broadcast channel (NPBCH for short), a master information block (MIB for short), a master information block for narrow band Internet of Things (MIB-NB for short) or a system information block (SIB for short).

In step 102, a current synchronization signal raster corresponding to the synchronization signal is determined according to the synchronization signal raster indication information.

In the present disclosure, the UE may determine the current synchronization signal raster corresponding to the synchronization signal according to the synchronization signal raster indication information. Optionally, the synchronization signal raster indication information may include the synchronization signal raster, and the UE determines the current synchronization signal raster corresponding to the synchronization signal according to the synchronization signal raster indication information.

In some embodiments of the present disclosure, the current synchronization signal raster corresponding to the synchronization signal may also be specified by a standard or a protocol, so that the UE may determine the current synchronization signal raster corresponding to the synchronization signal according to the standard or the protocol regulation.

In embodiments of the present disclosure, the UE receives the synchronization signal and the synchronization signal raster indication information, and determines the current synchronization signal raster corresponding to the synchronization signal according to the synchronization signal raster indication information. That is, the UE may determine a correct frequency range for sending the synchronization signal, so as to solve the confusion problem of synchronous raster caused by frequency offset.

FIG. 2 is a schematic flowchart illustrating another method for determining a synchronization signal according to an embodiment of the present disclosure. The method may be performed by a UE. As shown in FIG. 2, the method for determining the synchronization signal includes the following steps.

In step 201, a synchronization signal and synchronization signal raster indication information are received. The synchronization signal raster indication information is MIB, MIB-NB or SIB.

In the present disclosure, for the NB-IoT, long-term evolution (LTE for short) or eMTC, the synchronization signal raster indication information may be the MIB, the MIB-NB or the SIB, and the network device may indicate the synchronization signal raster information via the MIB, the MIB-NB or the SIB.

In step 202, the current synchronization signal raster corresponding to the synchronization signal is determined according to a value of a specified bit in the synchronization signal raster indication information.

In the present disclosure, the UE may determine the current synchronization signal raster corresponding to the synchronization signal according to the value of the specified bit in the MIB, the MIB-NB or the SIB.

For example, a calculation process of the synchronization signal raster is shown in formula (1):

$$y = M \times 100\ \text{kHz} + x\ \text{kHz} \quad (1)$$

The network device may indicate the values of the parameters M and x via specified bits in the MIB, the MIB-NB or the SIB, the UE may obtain the values of the parameters M and x according to the values of the specified bits in the MIB, the MIB-NB or the SIB, and then the current synchronization signal raster corresponding to the synchronization signal is calculated by using the above-mentioned formula (1).

Optionally, different bits may be used to indicate the values of the two parameters. The position of the specified bit in the MIB, the MIB-NB or the SIB may be sent to the UE by the network device in advance, or may be determined by the UE based on a protocol or standard agreement.

The bit used to indicate the values of the parameters M and x in the MIB, the MIB-NB or the SIB may be one, and one bit may indicate a plurality of sets of values of M and x. Each set of values includes the value of M and the value of x, such as a bit value of 0 corresponds to a set of values of M and x, a bit value of 1 corresponds to a set of values of M and x, a bit value of 2 corresponds to a set of values of M and x, and so on. Or, the plurality of bits may also be used to directly indicate the values of M and x.

In embodiments of the present disclosure, the synchronization signal raster indication information received by the UE may be the MIB, the MIB-NB or the SIB, and the UE may determine the current synchronization signal raster corresponding to the synchronization signal according to the value of the specified bit in the synchronization signal raster indication information, that is, the UE may determine the correct frequency range for sending the synchronization signal, so as to solve the confusion problem of the synchronization raster caused by the frequency offset.

FIG. 3 is a schematic flowchart illustrating another method for determining a synchronization signal according to an embodiment of the present disclosure. The method may be performed by a UE. As shown in FIG. 3, the method for determining the synchronization signal includes the following steps.

In step 301, a synchronization signal and synchronization signal raster indication information are received. The synchronization signal raster indication information is PSS.

In the present disclosure, the network device may use the PSS to indicate the current synchronization signal raster corresponding to the synchronization signal. For example, for LTE or eMTC, the network device may use the PSS to indicate the current synchronization signal raster corresponding to the synchronization signal. The UE may receive the synchronization signal and the PSS sent by the network device.

In step 302, the current synchronization signal raster corresponding to the synchronization signal is determined according to first generation parameters corresponding to the PSS obtained and a corresponding relationship between the individual first generation parameters and the individual synchronization signal rasters.

In the present disclosure, the UE may generate individual candidate PSSs according to a generation rule of the PSS and the individual first generation parameters. The first generation parameter corresponding to the PSS obtained is determined according to a correlation between the candidate PSSs and the PSS obtained. The synchronization signal raster corresponding to the first generation parameter of the PSS, that is, the current synchronization signal raster corresponding to the synchronization signal is determined according to the first generation parameter corresponding to the PSS obtained and a corresponding relationship between the individual first generation parameters and the individual synchronization signal rasters.

The corresponding relationship between the individual first generation parameters and the individual synchronization signal rasters may be sent to the UE by the network device in advance, or may be determined by the UE based on the protocol or standard agreement, which is not limited in the present disclosure. Optionally, if the calculation process of the synchronization signal raster is as shown in formula (1), the corresponding relationship between the individual first generation parameters and the individual synchronization signal rasters may also be a corresponding relationship between the individual first generation parameters and (M, x).

In addition, the generation rule of the PSS may also be sent to the UE by the network device in advance, or may be determined by the UE based on the protocol or standard agreement, which is not limited in the present disclosure.

It is noted that since different first generation parameters correspond to different candidate PSSs, the UE may use the first generation parameter corresponding to any candidate PSS related to the PSS obtained as the first generation parameter corresponding to the PSS obtained.

The correlation between the candidate PSSs and the PSS obtained may be determined in any way that may measure a relationship between the two signals, which is not limited in the present disclosure.

In embodiments of the present disclosure, the synchronization signal raster indication information may be the PSS, and the UE may determine the current synchronization signal raster corresponding to the synchronization signal according to the first generation parameters corresponding to the PSS obtained and the corresponding relationship between the individual first generation parameters and the individual synchronization signal rasters, that is, the UE may determine a correct frequency range for sending the synchronization signal, which solves the confusion problem of the synchronization raster caused by the frequency offset.

FIG. 4 is a schematic flowchart illustrating another method for determining a synchronization signal according to an embodiment of the present disclosure. The method may be performed by a UE. As shown in FIG. 4, the method for determining the synchronization signal includes the following steps.

In step 401, a synchronization signal and synchronization signal raster indication information are received. The synchronization signal raster indication information is NPSS.

In the present disclosure, the network device may use the NPSS to indicate the current synchronization signal raster corresponding to the synchronization signal. For example, for NB-IoT, the network device may use the NPSS to indicate the current synchronization signal raster corresponding to the synchronization signal, and the UE may receive the synchronization signal and the NPSS sent by the network device.

In step 402, the current synchronization signal raster corresponding to the synchronization signal is determined according to the second generation parameter corresponding to the NPSS obtained and a corresponding relationship between the individual second generation parameters and individual synchronization signal rasters.

In the present disclosure, the UE may generate individual candidate NPSSs according to a generation rule of the NPSS and individual second generation parameters. The second generation parameter corresponding to the NPSS obtained is determined according to a correlation between the candidate NPSSs and the NPSS obtained. The synchronization signal raster corresponding to the second generation parameter of the NPSS obtained, i.e., the current synchronization signal raster corresponding to the synchronization signal is determined according to the second generation parameter corresponding to the NPSS obtained and a corresponding relationship between the individual second generation parameters and individual synchronization signal rasters.

The corresponding relationship between the individual second generation parameters and the individual synchronization signal rasters may be sent to the UE by the network device in advance, or may be determined by the UE based on the protocol or standard agreement, which is not limited in the present disclosure. Optionally, if the calculation process of the synchronization signal raster is as shown in formula (1), the corresponding relationship between the individual second generation parameters and the individual synchronization signal rasters may also be a corresponding relationship between the individual second generation parameters and (M, x).

In addition, the generation rule of the NPSS may also be sent to the UE by the network device in advance, or may also be determined by the UE based on the protocol or standard agreement, which is not limited in the present disclosure.

It is noted that since different second generation parameters correspond to different candidate NPSSs, the UE may use the second generation parameter corresponding to any candidate NPSS related to the NPSS obtained as the second generation parameter corresponding to the NPSS obtained.

The correlation between the candidate NPSSs and the NPSS obtained may be determined in any way that may measure a relationship between the two signals, which is not limited in the present disclosure.

In embodiments of the present disclosure, the synchronization signal raster indication information may be the NPSS, and the UE may determine the current synchronization signal raster corresponding to the synchronization signal according to the second generation parameter corresponding to the NPSS obtained and the corresponding relationship between the individual second generation parameters and the individual synchronization signal rasters, that is, the UE may determine the correct frequency range for sending the synchronization signal, which solves the confusion problem of the synchronization raster caused by the frequency offset.

FIG. 5 is a schematic flowchart illustrating another method for determining a synchronization signal according to an embodiment of the present disclosure. The method may be performed by a UE. As shown in FIG. 5, the method for determining the synchronization signal includes the following steps.

In step 501, a synchronization signal and synchronization signal raster indication information are received. The synchronization signal raster indication information is PBCH or NPBCH.

In the present disclosure, the network device may use the PBCH or the NPBCH to indicate the current synchronization signal raster corresponding to the synchronization signal. The UE may receive the synchronization signal and the PBCH or the NPBCH sent by the network device.

In step 502, the current synchronization signal raster corresponding to the synchronization signal is determined according to a scrambling sequence corresponding to the PBCH or the NPBCH obtained and a corresponding relationship between individual scrambling sequences and individual synchronization signal rasters.

In the present disclosure, the UE may determine the synchronization signal raster corresponding to the scrambling sequence of the PBCH or the NPBCH obtained according to the scrambling sequence corresponding to the PBCH or the NPBCH obtained and the corresponding relationship between the individual scrambling sequences and the individual synchronization signal rasters. The scrambling sequence corresponding to the PBCH or the NPBCH obtained by the UE may be sent to the UE by the network device in advance, or may be determined by the UE based on the protocol or standard agreement, which is not limited in the present disclosure.

In addition, the corresponding relationship between the individual scrambling sequences and the individual synchronization signal rasters may be sent to the UE by the network device in advance, or may also be determined by the UE based on the protocol or standard agreement, which is not limited in the present disclosure. Optionally, if the calculation process of the synchronization signal raster is as shown in formula (1), the corresponding relationship between the individual scrambling sequences and the individual synchronization signal rasters may also be a corresponding relationship between the individual scrambling sequences and (M, x).

Optionally, if the network device configures individual third generation parameters and a generation rule of scrambling sequences for the UE, or the UE may determine the individual third generation parameters and a generation rule of the scrambling sequences based on the protocol or standard agreement, then the UE may generate individual candidate scrambling sequences corresponding to the PBCH or the NPBCH according to the generation rule of the scrambling sequences and the individual third generation parameters, and then obtain the PBCH or the NPBCH based on the candidate scrambling sequences and the corresponding relationship between the individual scrambling sequences and the individual synchronization signal rasters.

Generally, when the network device sends the synchronization signal raster indication information, in order to improve the anti-interference performance of the signal, the network device first scrambles the synchronization signal raster indication information with the scrambling sequences, and then sends the synchronization signal raster indication information scrambled to the UE. Correspondingly, the UE may try to receive the individual synchronization signal raster indication information based on the individual known scrambling sequences. If the reception is successful, it may be determined that the received scrambling sequence corresponding to the synchronization signal raster indication information is a currently used scrambling sequence. If the reception fails, the synchronization signal raster indication information is discarded.

It is noted that, in the present disclosure, for the generation rule of the scrambling sequences corresponding to the PBCH or the NPBCH, the generation formulas in the relevant protocols may be respectively adopted, or the formulas corresponding to other preset generation rules may be used, which is not limited in the present disclosure.

In embodiments of the present disclosure, the synchronization signal raster indication information may be the PBCH or the NPBCH, and the UE may determine the current synchronization signal raster corresponding to the synchronization signal according to the scrambling sequence corresponding to the PBCH or the NPBCH obtained and the corresponding relationship between the individual scrambling sequences and the individual synchronization signal rasters, that is, the UE may determine the correct frequency range for sending the synchronization signal, which solves the confusion problem of the synchronization raster caused by the frequency offset.

FIG. 6 is a schematic flowchart illustrating another method for determining a synchronization signal according to an embodiment of the present disclosure. The method may be performed by a UE. As shown in FIG. 6, the method for determining the synchronization signal includes the following steps.

In step 601, a synchronization signal and synchronization signal raster indication information are received. The synchronization signal raster indication information is the PBCH or the NPBCH.

In the present disclosure, the network device may use the PBCH or the NPBCH to indicate the current synchronization signal raster corresponding to the synchronization signal. The UE may receive the synchronization signal and the PBCH or the NPBCH sent by the network device.

In step 602, the current synchronization signal raster corresponding to the synchronization signal is determined according to a third generation parameter corresponding to the PBCH or the NPBCH obtained, and a corresponding relationship between individual third generation parameters and individual synchronization signal rasters.

In the present disclosure, different PBCHs correspond to different third generation parameters. The third generation parameters are parameters for generating scrambling sequences. Different third generation parameters correspond to different scrambling sequences, and further correspond to different PBCHs.

The UE may determine the synchronization signal raster corresponding to the third generation parameter, i.e., the current synchronization signal raster corresponding to the synchronization signal according to the third generation parameter corresponding to the PBCH or the NPBCH obtained, and the corresponding relationship between the individual third generation parameters and the individual synchronization signal rasters.

The third generation parameters corresponding to the PBCH or the NPBCH obtained, and the corresponding relationship between the individual third generation parameters and the individual synchronization signal rasters may be sent to the UE by the network device in advance, or may also be determined by the UE based on the protocol or standard agreement, which is not limited in the present disclosure.

In addition, the generation rule of the scrambling sequences may also be sent to the UE by the network device in advance, or may be determined by the UE based on the protocol or standard agreement, which is not limited in the present disclosure.

Optionally, if the network device configures the individual third generation parameters and a generation rule of the scrambling sequences for the UE, or the UE may determine the individual third generation parameters and the generation rule of the scrambling sequences based on the protocol or standard agreement, the UE may generate the individual candidate scrambling sequences corresponding to the PBCH or the NPBCH according to the generation rule of the scrambling sequences and the individual third generation parameters, and then obtain the PBCH or the NPBCH based on the candidate scrambling sequences.

Generally, when the network device sends the synchronization signal raster indication information, in order to improve the anti-interference performance of the signal, the network device first scrambles the synchronization signal raster indication information with scrambling sequences, and then sends the synchronization signal raster indication information scrambled to the UE. Correspondingly, the UE may try to receive the individual synchronization signal raster indication information based on the individual known scrambling sequences. If the reception is successful, it may be determined that the received scrambling sequence corresponding to the synchronization signal raster indication information is a currently used scrambling sequence. If the reception fails, the synchronization signal raster indication information is discarded.

It is noted that, in the present disclosure, for the generation rule of the scrambling sequences corresponding to the PBCH or the NPBCH, the generation formulas in the relevant protocols may be respectively adopted, or the formulas corresponding to other preset generation rules may be used, which is not limited in the present disclosure.

In embodiments of the present disclosure, the synchronization signal raster indication information may be the PBCH or the NPBCH, and the UE may determine the current synchronization signal raster corresponding to the synchronization signal according to the third generation parameter corresponding to the PBCH or the NPBCH obtained and the corresponding relationship between the individual third generation parameters and the individual synchronization signal rasters, that is, the UE may determine the correct frequency range for sending the synchronization signal, which solves the confusion problem of the synchronization raster caused by the frequency offset.

FIG. 7 is a schematic flowchart illustrating another method for determining a synchronization signal according to an embodiment of the present disclosure. The method for determining the synchronization signal may be executed by a network device.

As shown in FIG. 7, the method for determining the synchronization signal includes the following steps.

In step 701, synchronization signal raster indication information is sent. The synchronization signal raster indication information is configured to indicate a current synchronization signal raster corresponding to the synchronization signal.

In the present disclosure, the network device may send the synchronization signal raster indication information and the synchronization signal to the UE. The synchronization signal raster indication information is configured to indicate the current synchronization signal raster corresponding to the synchronization signal.

Optionally, the synchronization signal raster indication information may be at least one of PSS, NPSS, PBCH, NPBCH, MIB, MIB-NB or SIB.

Optionally, the synchronization signal raster indication information may include a synchronization signal raster, and the UE determines the current synchronization signal raster corresponding to the synchronization signal according to the synchronization signal raster indication information.

In some embodiments of the present disclosure, the current synchronization signal raster corresponding to the synchronization signal may also be specified by a standard or protocol, so that the UE may determine the current synchronization signal raster corresponding to the synchronization signal according to the standard or protocol regulation.

In embodiments of the present disclosure, the network device may send the synchronization signal raster indication information, in which the synchronization signal raster indication information is configured to indicate the current synchronization signal raster corresponding to the synchronization signal, so that the UE may determine the current synchronization signal raster corresponding to the synchronization signal according to the synchronization signal raster indication information, that is, the UE may determine the correct frequency range for sending the synchronization signal, which solves the confusion problem of the synchronization raster caused by the frequency offset.

FIG. 8 is a schematic flowchart illustrating another method for determining a synchronization signal according to an embodiment of the present disclosure. The method for determining the synchronization signal may be executed by a network device.

As shown in FIG. 8, the method for determining the synchronization signal includes the following steps.

In step 801, synchronization signal raster indication information is generated based on a specified rule, or synchronization signal raster indication information is generated based on a protocol regulation.

In the present disclosure, the network device may generate the synchronization signal raster indication information based on the specified rule. The synchronization signal raster indication information may be at least one of PSS, NPSS, PBCH, NPBCH, MIB, MIB-NB or SIB.

Optionally, the synchronization signal raster indication information is the PSS. Correspondingly, the network device may generate at least one PSS according to a generation rule of the PSS and at least one first generation parameter.

Different PSSs correspond to different first generation parameters. The first generation parameter may be preset by the network device, or may be determined based on a protocol or standard agreement, which is not limited in the present disclosure.

In addition, the generation rule of the PSS may also be preset by the network device, or may also be determined based on a protocol or standard agreement, which is not limited in the present disclosure.

It is noted that since the UE needs to determine the current synchronization signal raster corresponding to the synchronization signal according to the PSS obtained, the generation rule corresponding to the PSS and the first generation parameter on the UE side are the same as the generation rule corresponding to the PSS and the first generation parameter on the network device side, respectively. That is, if the generation rule of the PSS and the individual first generation parameters are preset on the network device side, the network device needs to send the generation rule of the PSS and the individual first generation parameters to the UE to realize the synchronization of the network device and the UE.

Optionally, a first generation parameter u of a new PSS sequence may be configured. Different PSS sequences have different first generation parameters u, and the PSS sequence $d_u(n)$ may be generated according to the following formula (2):

$$d_u(n) = \begin{cases} e^{-j\frac{\pi n(n+1)}{63}} & n = 0, 1, \ldots, 30 \\ e^{-j\frac{\pi u(n+1)(n+2)}{63}} & n = 31, 32, \ldots, 61 \end{cases} \quad (2)$$

It is understood that when the network device generates the PSS sequences according to the above-mentioned formula (2), the UE side may also generate the individual candidate PSS sequences based on the above-mentioned formula (2) and the corresponding individual first generation parameters, and then determine the first generation parameters corresponding to the PSS sequences obtained based on the correlation between the PSS sequences obtained and the candidate PSS sequences, such that the current synchronization signal raster corresponding to the synchronization signal is determined according to the first generation parameters corresponding to the PSS sequences obtained and the corresponding relationship between the individual first generation parameters and the individual synchronization signal rasters.

It is noted that the above-mentioned formula is illustrative, and the value n of the sequence may be adjusted in any form according to needs, such as increasing or decreasing, which is not limited in the present disclosure.

Or, the synchronization signal raster indication information is the NPSS. Correspondingly, the network device may generate at least one NPSS according to a generation rule of the NPSS and at least one second generation parameter set.

Different NPSSs correspond to different second generation parameters. The second generation parameters may be preset by the network device, or may be determined based on the protocol or standard agreement, which is not limited in the present disclosure.

In addition, the generation rule of the NPSS may also be preset by the network device, or may also be determined based on the protocol or standard agreement, which is not limited in the present disclosure.

It is noted that since the UE needs to determine the current synchronization signal raster corresponding to the synchronization signal according to the NPSS obtained, the generation rule corresponding to the NPSS and the second generation parameter on the UE side are the same as the generation rule corresponding to the NPSS and the second generation parameter on the network device side. That is, if the generation rule of the NPSS and the individual second generation parameters are preset on the network device side, the network device needs to send the generation rule of the NPSS and the individual second generation parameters to the UE to achieve synchronization between the network device and the UE.

Optionally, a second generation parameter u of a new NPSS sequence may be configured, and different NPSS sequences have different second generation parameters u, and the NPSS sequence $d_l(n)$ may be generated according to the following formula (3):

$$d_l(n) = S(l) \cdot e^{-j\frac{\pi u n(n+1)}{11}}, \; n = 0, 1, \Lambda, 10 \quad (3)$$

where a value of S(l) may be shown in Table 1 below, and l represents a symbol index.

TABLE 1

| Values of S(l) S(3), K, S(13) | | | | | | | | | | |
|---|---|---|---|---|---|---|---|---|---|---|
| 1 | 1 | 1 | 1 | −1 | −1 | 1 | 1 | 1 | −1 | 1 |

It is understood that when the network device generates the NPSS sequence according to the above-mentioned formula (3), the UE side may also generate the individual candidate NPSS sequences based on the above-mentioned formula (3) and the corresponding individual second generation parameters, and then determines the second generation parameter corresponding to the NPSS sequence obtained based on the correlation between the NPSS sequences obtained and the candidate NPSS sequences, such that the current synchronization signal raster corresponding to the synchronization signal is determined according to the second generation parameter corresponding to the NPSS sequence obtained and the corresponding relationship between the individual second generation parameters and the individual synchronization signal rasters.

It is noted that the above-mentioned formula is illustrative, and the value n of the sequence may be adjusted in any form according to needs, such as increasing or decreasing, which is not limited in the present disclosure.

Optionally, the synchronization signal raster indication information is the PBCH or the NPBCH. Correspondingly, the network device may generate at least one scrambling sequence corresponding to the PBCH or the NPBCH according to a generation rule of the scrambling sequence corresponding to the PBCH or the NPBCH and at least one third generation parameter.

Different PBCHs or NPBCHs correspond to different scrambling sequences and/or third generation parameters. The third generation parameters are parameters for generating scrambling sequences, and different third generation parameters correspond to different scrambling sequences, thereby corresponding to different PBCHs or NPBCHs. That is, different PBCHs or NPBCHs correspond to different third generation parameters or different scrambling sequences.

The scrambling sequences and/or the third generation parameters may be pre-configured on the network device side, or may also be determined based on the protocol or standard agreement, which is not limited in the present disclosure.

In addition, the generation rule of the scrambling sequence may also be pre-configured on the network device side, or may also be determined by the network device based on the protocol or standard agreement, which is not limited in the present disclosure.

Generally, when the network device sends the synchronization signal raster indication information, in order to improve the anti-interference performance of the signal, the network device first scrambles the synchronization signal raster indication information with the scrambling sequence, and then sends the synchronization signal raster indication information scrambled to the UE. Correspondingly, the UE may try to receive the individual synchronization signal raster indication information based on the individual known scrambling sequences. If the reception is successful, it may be determined that the received scrambling sequences corresponding to the synchronization signal raster indication information is a currently used scrambling sequence. If the reception fails, the synchronization signal raster indication information is discarded.

Correspondingly, the current synchronization signal raster corresponding to the synchronization signal may be determined according to the third generation parameter or the scrambling sequence corresponding to the PBCH or the NPBCH.

It is noted that since the UE needs to determine the current synchronization signal raster corresponding to the synchronization signal according to the synchronization signal raster indication information received, the generation rule of the scrambling sequence corresponding to the PBCH or the NPBCH and the third generation parameter at the UE side are the same as the generation rule of the scrambling sequence corresponding to the PBCH or the NPBCH and the third generation parameter at the network device side. That is, if the generation rule of the scrambling sequence corresponding to the PBCH or the NPBCH and the third generation parameter are preset on the network device side, the network device needs to send the generation rule of the scrambling sequence corresponding to the PBCH or the NPBCH and the third generation parameter to the UE to achieve synchronization between the network device and the UE.

Optionally, the third generation parameter $c_{init}$ of the scrambling sequence corresponding to the new PBCH or NPBCH may also be configured. Different scrambling sequences have different third generation parameters $c_{init}$. The scrambling sequence c(n) may be generated based on the following formula (4):

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \tag{4}$$

where $N_C=1600$, $x_1(0)=1,\ x_1(n)=0,\ n=1, 2, \ldots, 30$, an initialization value of $$x_2(n) \text{ is } c_{init}=\sum_{i=0}^{30} x_2(i)\cdot 2^i.$$

It is understood that when the network device generates the scrambling sequence corresponding to the PBCH or the NPBCH according to the above-mentioned formula (4), the UE side may also generate the scrambling sequence corresponding to the PBCH or the NPBCH based on the above-mentioned formula (4) and the individual corresponding third generation parameters, and try to receive the PBCH or the NPBCH based on the scrambling sequence corresponding to the PBCH or the NPBCH generated.

It is noted that the above-mentioned formula is illustrative, and a value of the sequence may be adjusted in any form according to needs, such as increasing or decreasing, which is not limited in the present disclosure.

Or, the network device may also generate the synchronization signal raster indication information based on the protocol regulation, in which the synchronization signal raster indication information may include the synchronization signal raster, such that the UE may determine the current synchronization signal raster corresponding to the synchronization signal according to the synchronization signal raster indication information.

In step 802, the synchronization signal raster indication information is sent. The synchronization signal raster indication information is configured to indicate the current synchronization signal raster corresponding to the synchronization signal.

In the present disclosure, step 802 may be implemented in any one of embodiments of the present disclosure, which is not limited in embodiments of the present disclosure, and will not be repeated here.

In embodiments of the present disclosure, the network device may generate the synchronization signal raster indication information according to the specified rule, or generate the synchronization signal raster indication information based on the protocol regulation and send the synchronization signal raster indication information, so that the UE may determine the current synchronization signal raster corresponding to the synchronization signal according to the synchronization signal raster indication information, that is, the UE may determine the correct frequency range for sending the synchronization signal, which solves the confusion problem of the synchronization raster caused by the frequency offset.

FIG. 9 is a schematic diagram illustrating an apparatus for determining a synchronization signal according to an embodiment of the present disclosure. The device is applied to UE. As shown in FIG. 9, the apparatus 120 for determining the synchronization signal includes a receiving module 910 and a processing module 920.

The receiving module 910 is configured to receive the synchronization signal and synchronization signal raster indication information.

The processing module 920 is configured to determine a current synchronization signal raster corresponding to the synchronization signal according to the synchronization signal raster indication information.

Optionally, the synchronization signal raster indication information is at least one of: PSS, NPSS, PBCH, NPBCH, MIB, MIB-NB or SIB.

Optionally, the synchronization signal raster indication information is the MIB, the MIB-NB or the SIB, and the processing module 920 is configured to determine the current synchronization signal raster corresponding to the synchronization signal according to a value of a specified bit in the synchronization signal raster indication information.

Optionally, the synchronization signal raster indication information is the PSS, and the processing module 920 is configured to:

generate individual candidate PSSs according to a generation rule of the PSS and individual first generation parameters;

determine the first generation parameter corresponding to the PSS obtained according to a correlation between the candidate PSSs and the PSS obtained;

determine the current synchronization signal raster corresponding to the synchronization signal according to the first generation parameter corresponding to the PSS obtained and a corresponding relationship between the individual first generation parameters and individual synchronization signal rasters.

Optionally, the synchronization signal raster indication information is the PSS, and the processing module 920 is configured to:

generate individual candidate NPSSs according to a generation rule of the NPSS and individual second generation parameters;

determine the second generation parameter corresponding to the NPSS obtained according to a correlation between the candidate NPSSs and the NPSS obtained;

determine the current synchronization signal raster corresponding to the synchronization signal according to the second generation parameter corresponding to the NPSS obtained, and a corresponding relationship between the individual second generation parameters and individual synchronization signal rasters.

Optionally, the synchronization signal raster indication information is the PSS, and the processing module 920 is configured to determine the current synchronization signal raster corresponding to the synchronization signal according to a scrambling sequence corresponding to the PBCH or the NPBCH obtained and a corresponding relationship between individual scrambling sequences and individual synchronization signal rasters.

Optionally, the synchronization signal raster indication information is the PSS, and the processing module 920 is configured to determine the current synchronization signal raster corresponding to the synchronization signal according to a third generation parameter corresponding to the PBCH or the NPBCH obtained and a corresponding relationship between individual third generation parameters and individual synchronization signal rasters.

Optionally, the processing module 920 is further configured to:

generate individual candidate scrambling sequences corresponding to the PBCH or the NPBCH according to a generation rule of the scrambling sequence and the individual third generation parameters;

obtain the PBCH or the NPBCH based on the candidate scrambling sequences.

Optionally, the processing module 920 is further configured to determine the current synchronization signal raster corresponding to the synchronization signal according to a protocol regulation.

It is noted that the above-mentioned explanations on embodiments of the method for determining the synchronization signal provided in FIGS. 1 to 6 are also applicable to embodiments of the apparatus for determining the synchronization signal, which are not repeated here in detail.

In embodiments of the present disclosure, the UE receives the synchronization signal and the synchronization signal raster indication information, and determines the current synchronization signal raster corresponding to the synchronization signal according to the synchronization signal raster indication information, that is, the UE may determine the correct frequency range for sending the synchronization signal, which solves the confusion problem of the synchronization raster caused by the frequency offset.

Figure 10:
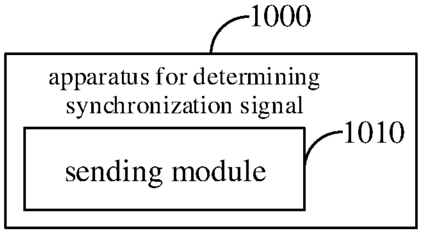
FIG. 10 is a schematic diagram illustrating an apparatus for determining a synchronization signal according to an embodiment of the present disclosure.

FIG. 10 is a schematic diagram illustrating an apparatus for determining a synchronization signal according to an embodiment of the present disclosure. The apparatus is suitable for network device. As shown in FIG. 10, the apparatus 1000 for determining the synchronization signal includes a sending module 1010.

The sending module 1010 is configured to send the synchronization signal raster indication information. The synchronization signal raster indication information is configured to indicate the current synchronization signal raster corresponding to the synchronization signal.

Optionally, the synchronization signal raster indication information is at least one of: PSS, NPSS, PBCH, NPBCH, MIB, MIB-NB or SIB.

Optionally, the apparatus may further include a generating module configured to:

generate the synchronization signal raster indication information based on a specified rule; or generating the synchronization signal raster indication information based on a protocol regulation.

Optionally, the synchronization signal raster indication information is the PSS, and the generating module is configured to:

generate at least one PSS according to a generation rule of the PSS and at least one first generation parameter.

Optionally, the synchronization signal raster indication information is the NPSS, and the generating module is configured to:

generate at least one NPSS according to a generation rule of the NPSS and at least one second generation parameter set.

Optionally, the synchronization signal raster indication information is the PBCH or the NPBCH, and the generating module is configured to:

generate at least one scrambling sequence corresponding to the PBCH or the NPBCH according to a generation rule of the scrambling sequence corresponding to the PBCH or the NPBCH and at least one third generation parameter.

It is noted that the above-mentioned explanations on embodiments of the method for determining the synchronization signal provided in FIGS. 7 to 8 are also applicable to embodiments of the apparatus for determining the synchronization signal, which will not be repeated here.

In embodiments of the present disclosure, the network device may send the synchronization signal raster indication information, in which the synchronization signal raster indication information is configured to indicate the current synchronization signal raster corresponding to the synchronization signal, so that the UE may determine the current synchronization signal raster corresponding to the synchronization signal according to the synchronization signal raster indication information, that is, the UE may determine the correct frequency range for sending the synchronization signal, which solves the confusion problem of the synchronization raster caused by the frequency offset.

In order to implement the above-mentioned embodiments, the present disclosure also provides a communication device.

The communication device provided by embodiments of the present disclosure includes a processor, a transceiver, a memory, and an executable program stored on the memory and executed by the processor. The above-mentioned method is executed when the executable program is executed by the processor.

The communication device may be the above-mentioned network device or the above-mentioned user equipment.

The processor may include various types of storage media, which are non-transitory computer storage media, and may continue to memorize and store information thereon after the communication device is powered off. The communication device includes a base station or a terminal.

The processor may be connected to the memory through a bus or the like, and is configured to read the executable program stored on the memory, for example, to implement the method for determining the synchronization signal as described in at least one of FIGS. 1 to 8.

In order to realize the above-mentioned embodiments, the present disclosure also provides a computer storage medium.

The computer storage medium provided by embodiments of the present disclosure stores an executable program. After the executable program is executed by the processor, the above-mentioned method may be implemented, for example, the method for determining the synchronization signal as described in at least one of FIGS. 1 to 8.

Figure 11:
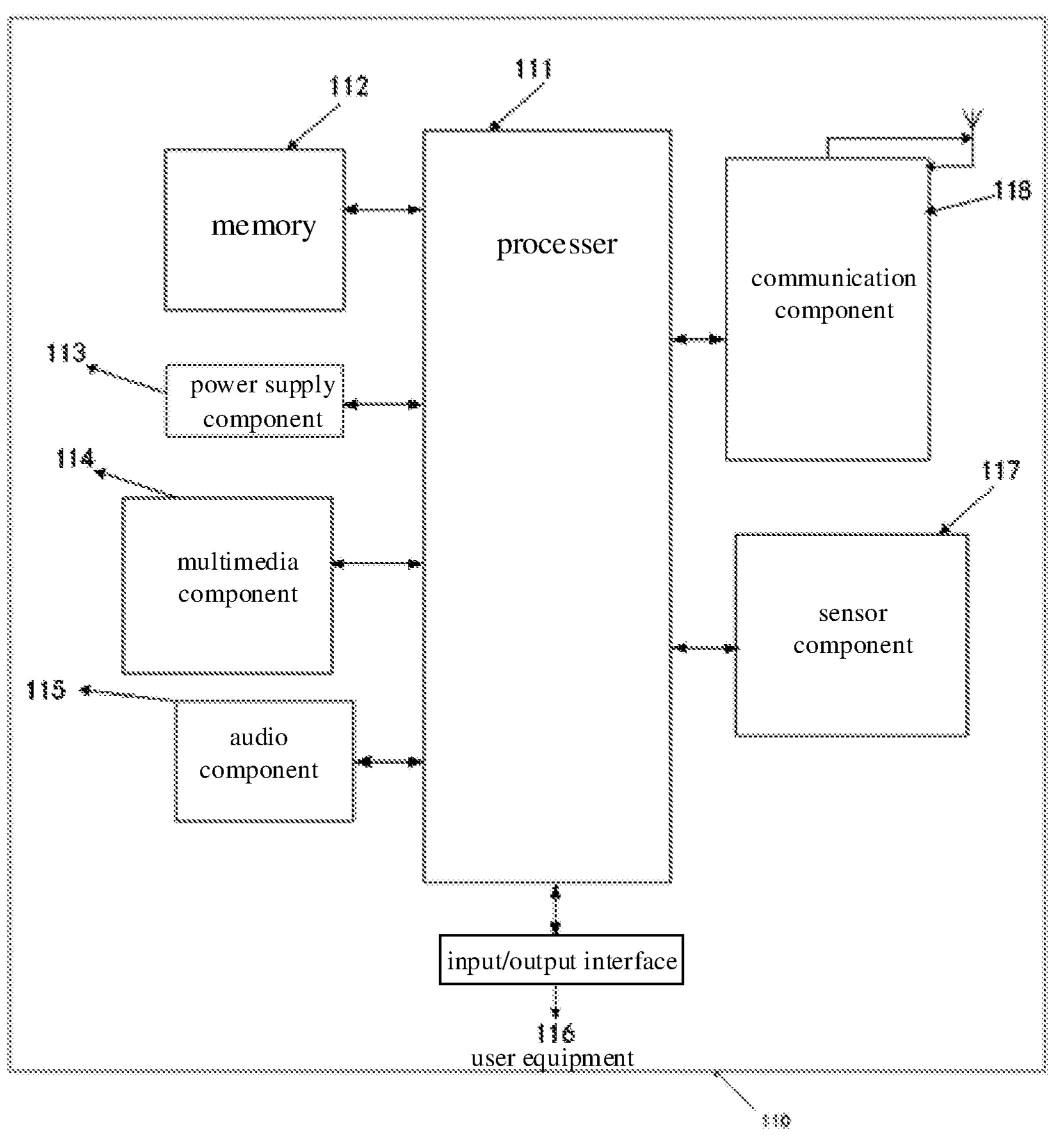
FIG. 11 is a schematic diagram illustrating a user equipment according to an embodiment of the present disclosure.

FIG. 11 is a schematic diagram illustrating a user equipment according to an embodiment of the present disclosure. For example, the user equipment 110 may be a mobile phone, a computer, digital broadcast user equipment, a messaging device, a game console, a tablet device, a medical device, a fitness device, a personal digital assistant, or the like.

Referring to FIG. 11, the user equipment 110 may include one or more of the following components: a processing component 111, a memory 112, a power supply component 113, a multimedia component 114, an audio component 115, an input/output (I/O) interface 116, a sensor component 117, and a communication component 118.

The processing component 111 generally controls the overall operations of the user equipment 110, such as the operations associated with display, telephone calls, data communications, camera operations, and recording operations. The processing component 111 may include one or more processors to execute instructions to complete all or part of the steps in the above-described method in FIGS. 1 to 6. Additionally, the processing component 111 may include at least one module which facilitate the interaction between the processing component 111 and other components. For instance, the processing component 111 may include a multimedia module to facilitate the interaction between the multimedia component 114 and the processing component 111.

The memory 112 is configured to store various types of data to support the operation of the user equipment 110. Examples of such data include instructions for any applications or methods operated on the user equipment 110, contact data, phonebook data, messages, pictures, videos, etc. The memory 112 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 113 provides power to various components of the user equipment 110. The power component 113 may include a power management system, at least one power source, and any other components associated with the generation, management, and distribution of power in the user equipment 110.

The multimedia component 114 includes a screen providing an output interface between the user equipment 110 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense awake time and a pressure associated with the touch or swipe action. In some embodiments, the multimedia component 114 includes a front camera and/or a rear camera. The front camera and/or the rear camera may receive an external multimedia datum while the user equipment 110 is in an operation mode, such as a photographing mode or a video mode. Each of the front camera and the rear camera may be a fixed optical lens system or have focus and optical zoom capability.

The audio component 115 is configured to output and/or input audio signals. For example, the audio component 115 includes a microphone (MIC) configured to receive an external audio signal when the user equipment 110 is in an operation mode, such as a call mode, a recording mode, and a voice recognition mode. The received audio signal may be further stored in the memory 112 or transmitted via the communication component 118. In some embodiments, the audio component 115 further includes a speaker to output audio signals.

The I/O interface 116 provides an interface between the processing component 111 and peripheral interface modules, such as keyboards, click wheels, buttons, and the like. The buttons may include, but are not limited to, a home button, a volume button, a starting button, and a locking button.

The sensor component 117 includes at least one sensor to provide status assessments of various aspects of the user equipment 110. For instance, the sensor component 117 may detect an open/closed status of the user equipment 110, relative positioning of components, e.g., the display and the keypad, of the user equipment 110, a change in position of the user equipment 110 or a component of the user equipment 110, a presence or absence of user contact with the user equipment 110, an orientation or an acceleration/deceleration of the user equipment 110, and a change in temperature of the user equipment 110. The sensor component 117 may include a proximity sensor configured to detect the presence of nearby objects without any physical contact. The sensor component 117 may also include a light sensor, such as a CMOS or CCD image sensor, for use in imaging applications. In some embodiments, the sensor component 117 may also include an accelerometer sensor, a gyroscope sensor, a magnetic sensor, a pressure sensor, or a temperature sensor.

The communication component 118 is configured to facilitate communication, wired or wireless, between the user equipment 110 and other devices. The user equipment 110 may access a wireless network based on a communication standard, such as WiFi, 2G, 3G, or a combination thereof. In one illustrative embodiment, the communication component 118 receives a broadcast signal or broadcast associated information from an external broadcast management system via a broadcast channel. In one illustrative embodiment, the communication component 118 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the user equipment 110 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described method.

In illustrative embodiments, there is also provided a non-transitory computer-readable storage medium including instructions, such as included in the memory 112, executable by the processor 111 in the user equipment 110, for performing the above-described method. For example, the non-transitory computer-readable storage medium may be a ROM, a random access memory (RAM), a CD-ROM, a magnetic tape, a floppy disc, an optical data storage device, and the like.

Figure 12:
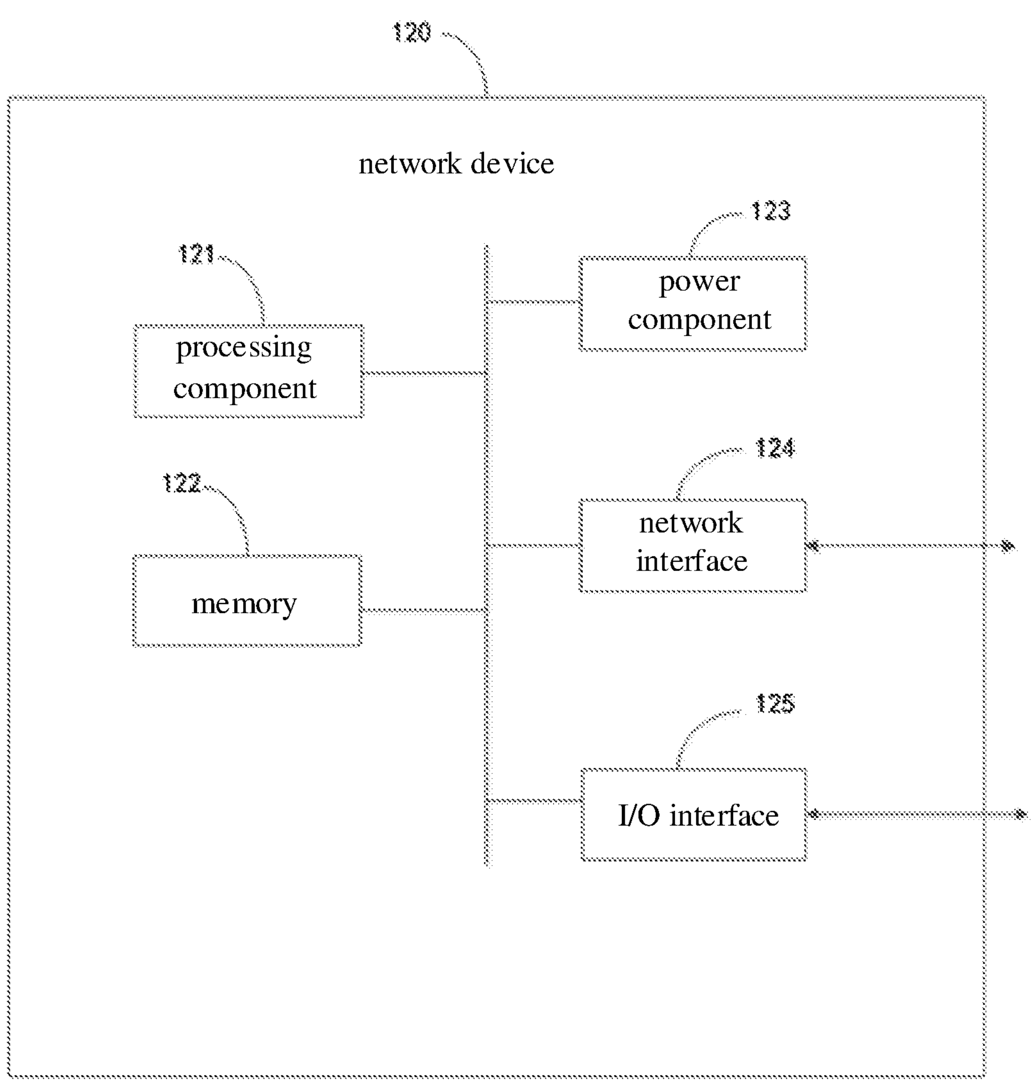
FIG. 12 is a schematic diagram illustrating a network device according to an embodiment of the present disclosure.

FIG. 12 is a schematic diagram illustrating a network device according to an embodiment of the present disclosure. As shown in FIG. 12, the network device 120 includes a processing component 121 that further includes at least one processor, and a memory resource represented by a memory 132 for storing instructions that may be executable by the processing component 121 such as application programs. The application program stored in the memory 122 may include one or more modules each corresponding to a set of instructions. In addition, the processing component 121 is configured to execute instructions to perform the method in any one of the above-mentioned embodiments by the network device, for example, the methods shown in FIG. 7 to FIG. 8.

The base station 120 may also include a power component 123 configured to perform power management of the base station 120, a wired or wireless network interface 124 configured to connect the base station 120 to a network, and an input-output (I/O) interface 125. The base station 120 may operate based on an operating system stored in the memory 121, such as Windows Server™, Mac OS X™, Unix™, Linux™, FreeBSD™ or the like.

Those skilled in the art may understand that all or part of the steps carried by the methods of the above-mentioned embodiments may be completed by instructing related hardware through a program, and the program may be stored in a computer-readable storage medium. During execution of the program, one or a combination of the steps of the method embodiments is included.

In addition, each functional unit in each embodiment of the present disclosure may be integrated into one processing module, each unit may exist separately physically, or two or more units may be integrated into one module. The above-mentioned integrated modules may be implemented in a form of hardware or in a form of software function modules. If the integrated modules are realized in the form of software function modules and sold or used as independent products, they can also be stored in a computer-readable storage medium.

The storage medium mentioned above may be a read-only memory, a magnetic disk or an optical disk, and the like.

The descriptions above are only preferred implementations of the present disclosure. It is pointed out that those skilled in the art may make some improvements and modifications without departing from the principle of the present disclosure, and these improvements and modifications are also regarded as the protection scope of the present disclosure.

What is claimed is:

1. A method for determining a synchronization signal, performed by a user equipment (UE) and comprising:

receiving the synchronization signal and synchronization signal raster indication information; and determining a current synchronization signal raster corresponding to the synchronization signal according to the synchronization signal raster indication information;

wherein the synchronization signal raster indication information comprises at least one of: a master information block (MIB), a master information block for narrow band Internet of Things (MIB-NB) or a system information block (SIB);

wherein the synchronization signal raster indication information is one of the MIB, the MIB-NB or the SIB, and determining the current synchronization signal raster corresponding to the synchronization signal according to the synchronization signal raster indication information comprises:

determining the current synchronization signal raster corresponding to the synchronization signal according to a value of a specified bit in the synchronization signal raster indication information;

wherein a calculation process of a current synchronization signal raster y corresponding to the synchronization signal is as follows:

$$y = M \times 100 \text{ kHz} + x \text{ kHz};$$

wherein the UE obtains values of parameters M and x according to a value of a specified bit in the MIB, the MIB-NB or the SIB.

2. The method according to claim 1, wherein the synchronization signal raster indication information further comprises at least one of: a primary synchronization signal (PSS), a narrow band primary synchronization signal (NPSS), a physical broadcast channel (PBCH), or a narrow band physical broadcast channel (NPBCH).

3. The method according to claim 2, wherein the synchronization signal raster indication information is one of the PBCH or the NPBCH, and determining the current synchronization signal raster corresponding to the synchronization signal according to the synchronization signal raster indication information comprises:

determining the current synchronization signal raster corresponding to the synchronization signal according to a scrambling sequence corresponding to one of a PBCH or an NPBCH obtained and a corresponding relationship between individual scrambling sequences and individual synchronization signal rasters.

4. The method according to claim 2, wherein the synchronization signal raster indication information is one of the PBCH or the NPBCH, and determining the current synchronization signal raster corresponding to the synchronization signal according to the synchronization signal raster indication information comprises:

determining the current synchronization signal raster corresponding to the synchronization signal according to a third generation parameter corresponding to one of a PBCH or an NPBCH obtained and a corresponding relationship between individual third generation parameters and individual synchronization signal rasters.

5. The method according to claim 4, further comprising:

generating individual candidate scrambling sequences corresponding to the one of the PBCH or the NPBCH according to a generation rule of the scrambling sequence and the individual third generation parameters; and obtaining the one of the PBCH or the NPBCH based on the candidate scrambling sequences.

6. The method according to claim 1, further comprising:

determining the current synchronization signal raster corresponding to the synchronization signal according to a protocol regulation.

7. A method for determining a synchronization signal, performed by a network device and comprising:

sending a synchronization signal raster indication information, wherein the synchronization signal raster indication information is configured to indicate a current synchronization signal raster corresponding to the synchronization signal;

wherein the synchronization signal raster indication information comprises at least one of: a master information block (MIB), a master information block for narrow band Internet of Things (MIB-NB) or a system information block (SIB);

wherein the synchronization signal raster indication information is one of the MIB, the MIB-NB or the SIB, and a calculation process of a current synchronization signal raster y corresponding to the synchronization signal is as follows:

$$y = M \times 100 \text{ kHz} + x \text{ kHz};$$

wherein values of parameters M and x are indicated by a specified bit in the MIB, the MIB-NB or the SIB.

8. The method according to claim 7, wherein the synchronization signal raster indication information further comprises at least one of: a physical broadcast channel (PBCH), a narrow band physical broadcast channel (NPBCH), or a primary synchronization signal (PSS), a narrow band primary synchronization signal (NPSS).

9. The method according to claim 2, wherein the synchronization signal raster indication information is the PSS, and determining the current synchronization signal raster corresponding to the synchronization signal according to the synchronization signal raster indication information comprises:

generating individual candidate PSSs according to a generation rule of the PSS and individual first generation parameters;

determining a first generation parameter corresponding to a PSS obtained according to a correlation between the candidate PSSs and the PSS obtained; and determining the current synchronization signal raster corresponding to the synchronization signal according to the first generation parameter corresponding to the PSS obtained and a corresponding relationship between the individual first generation parameters and individual synchronization signal rasters.

10. The method according to claim 2, wherein the synchronization signal raster indication information is the NPSS, and determining the current synchronization signal raster corresponding to the synchronization signal according to the synchronization signal raster indication information comprises:

generating individual candidate NPSSs according to a generation rule of the NPSS and individual second generation parameters;

determining a second generation parameter corresponding to an NPSS obtained according to a correlation between the candidate NPSSs and the NPSS obtained; and determining the current synchronization signal raster corresponding to the synchronization signal according to the second generation parameter corresponding to the NPSS obtained, and a corresponding relationship between individual the second generation parameters and individual synchronization signal rasters.

11. A communication device, comprising:

at least one processor; and a memory communicatively coupled to the at least one processor;

wherein the processor is configured to:

receive a synchronization signal and synchronization signal raster indication information; and determine a current synchronization signal raster corresponding to the synchronization signal according to the synchronization signal raster indication information;

wherein the synchronization signal raster indication information comprises at least one of: a master information block (MIB), a master information block for narrow band Internet of Things (MIB-NB) or a system information block (SIB);

wherein the synchronization signal raster indication information is one of the MIB, the MIB-NB or the SIB, and the processor is further configured to:

determine the current synchronization signal raster corresponding to the synchronization signal according to a value of a specified bit in the synchronization signal raster indication information;

wherein a calculation process of a current synchronization signal raster y corresponding to the synchronization signal is as follows:

$$y = M \times 100 \text{ kHz} + x \text{ kHz};$$

wherein the UE obtains values of parameters M and x according to a value of a specified bit in the MIB, the MIB-NB or the SIB.

12. The communication device according to claim 11, wherein the synchronization signal raster indication information further comprises at least one of: a physical broadcast channel (PBCH), a narrow band physical broadcast channel (NPBCH), a primary synchronization signal (PSS), or a narrow band primary synchronization signal (NPSS).

13. The method according to claim 8, wherein generating synchronization signal raster indication information based on one of a specified rule or a protocol regulation.

14. The method according to claim 13, wherein the synchronization signal raster indication information is the PSS, and generating the synchronization signal raster indication information based on the specified rule comprises:

generating at least one PSS according to a generation rule of the PSS and at least one first generation parameter.

15. The method according to claim 13, wherein the synchronization signal raster indication information is the NPSS, and generating the synchronization signal raster indication information based on the specified rule comprises:

generating at least one NPSS according to a generation rule of the NPSS and at least one second generation parameter set.

16. The method according to claim 13, wherein the synchronization signal raster indication information is one of the PBCH or the NPBCH, and generating the synchronization signal raster indication information based on the specified rule comprises:

generating at least one scrambling sequence corresponding to the one of the PBCH or the NPBCH according to a generation rule of the scrambling sequence corresponding to the one of the PBCH or the NPBCH and at least one third generation parameter.

* * * * *